Figure 1:
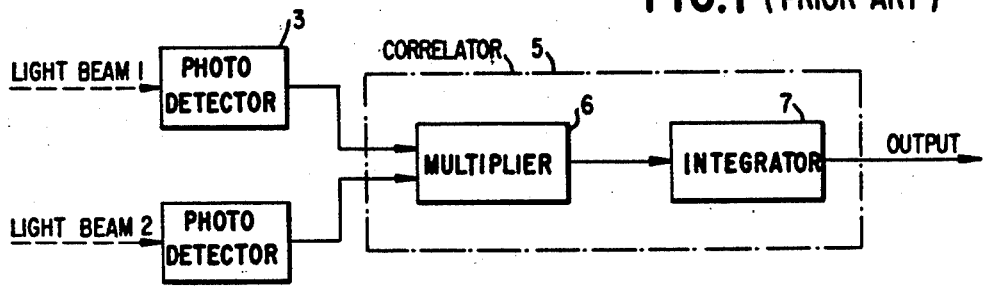

May 26, 1964   H. GAMO   3,134,840
OPTICAL PHASE MEASURING APPARATUS
Filed April 10, 1961   2 Sheets-Sheet 1

INVENTOR
HIDEYA GAMO

BY Sughrue, Rothwell, Mion & Zinn
ATTORNEYS

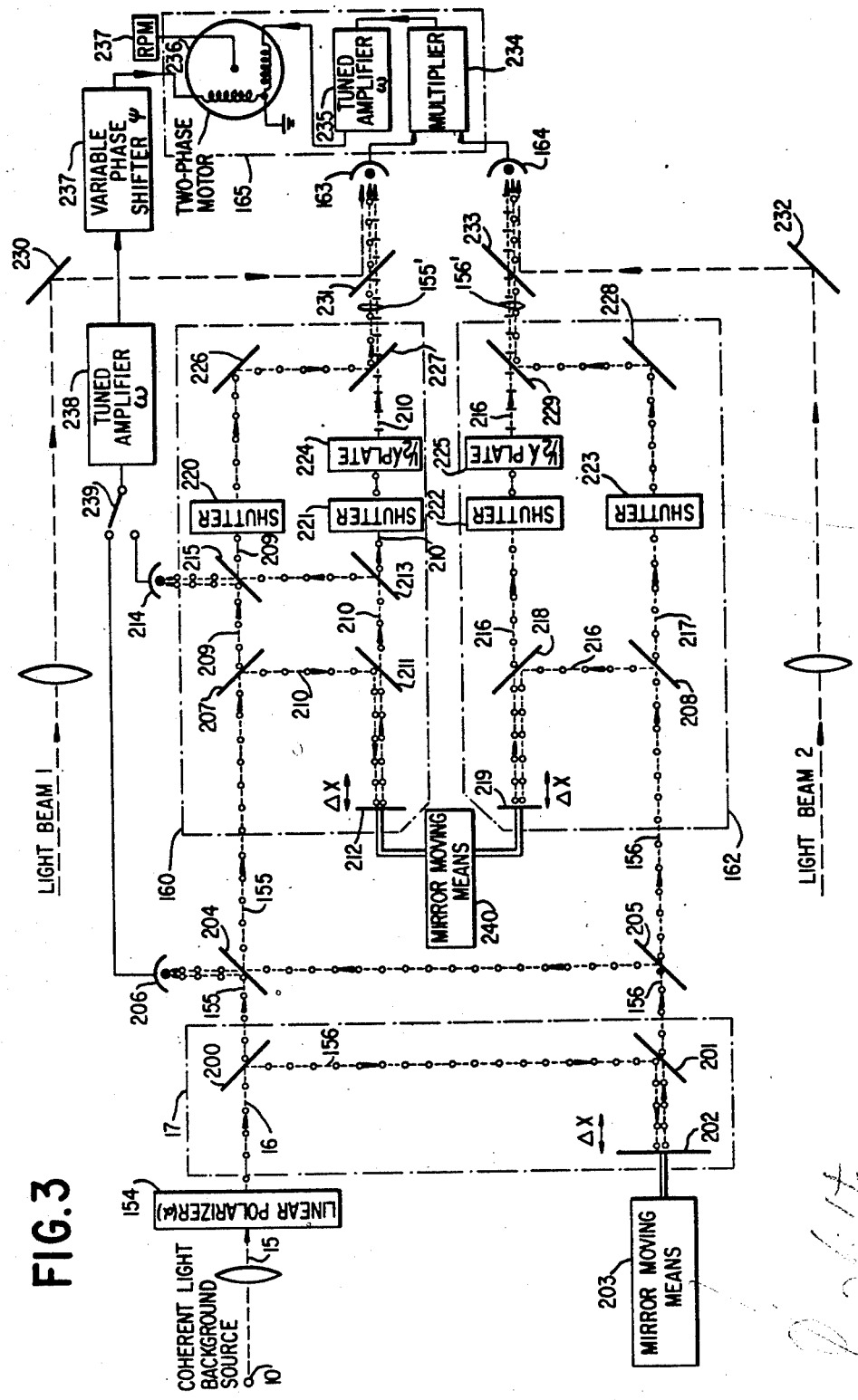

United States Patent Office 3,134,840
Patented May 26, 1964

3,134,840
OPTICAL PHASE MEASURING APPARATUS
Hideya Gamo, Katonah, N.Y., assignor to International Business Machines Corporation, New York, N.Y., a corporation of New York
Filed Apr. 10, 1961, Ser. No. 101,750
14 Claims. (Cl. 88—14)

This invention relates to apparatus for measuring the polarization characteristics of light, and more particularly, to an intensity interferometer using a coherent light background the polarization of which is varied to enable measurement of polarization characteristics of light falling on said interferometer.

Present day interferometry techniques have been strengthened by the development of the so-called intensity interferometer by Hanbury-Brown and Twiss, the theory and details of which may be found in the Proceedings of The Royal Society of London; vol. A242, pages 300–324 (1957), and vol. A243, pages 291–319 (1957), hereinafter referred to as Publications A and B. The original Hanbury Brown-Twiss intensity interferometer, as there described, offers experimental proof that the times of emission of photo-electrons at different points illuminated by coherent beams of light are partially correlated. The authors state that this result forms a basis for the claim that the correlation is essentially an interference effect exemplifying the wave, rather than corpuscular, aspect of light. The intensity interferometer therefore is quite important in modern physical optics, since it develops a correlation function for the intensity fluctuations in two coherent, or partially coherent, beams of light by sampling the currents from two photo-detectors upon which said beams impinge.

The correlation function derived by the original Hanbury Brown-Twiss interferometer is proportional to the square of the absolute value of the phase coherence factor of the two beams. The phase coherence factor itself is a complex number having a phase as well as an absolute value. As will subsequently be pointed out, knowledge of this phase is desirable for certain measurements. However, such phase information cannot be conveniently ascertained from merely the square of the absolute value of the phase coherence factor.

Besides knowledge of the phase above mentioned, it is also desirable at times to measure certain polarization characteristics of light beams. Normally, in order to do this, polarizing elements must be inserted into the paths of the beams. However, the present invention provides polarizing elements only in the coherent background source.

It is therefore an object of the present invention to provide an intensity interferometer with a source of coherent background so that complete information about the phase coherence factor may be determined, including its phase.

Another object of the present invention is to provide means in the coherent background of an intensity interferometer to measure certain polarization characteristics of the incident beams.

Figure 2:
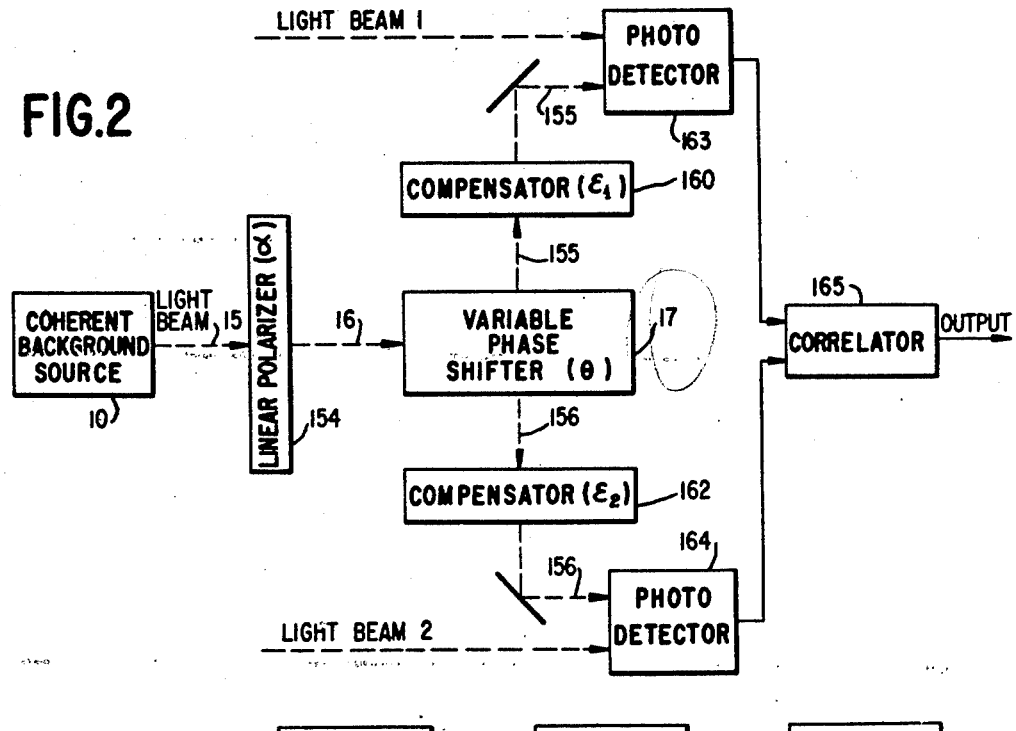
Figure 4:
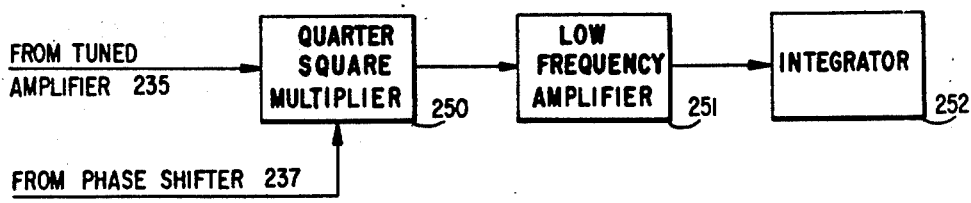

These and other objects of the invention will become apparent during the course of the following description, when taken in conjunction with the drawings, in which:

FIGURE 1 shows the prior art intensity interferometer;
FIGURE 2 shows a block diagram of the present invention using coherent background and polarizing elements;
FIGURE 3 shows the details of FIGURE 2; and
FIGURE 4 shows an electronic synchronous detector for use in FIGURE 3.

In order to fully appreciate the novel concepts of the present invention, reference will first be made to the intensity interferometer originally proposed by authors Hanbury-Brown and Twiss in publications A and B identified above. FIGURE 1 shows a simplified block diagram of this prior art device. Fully or partially coherent quasi-monochromatic light beams 1 and 2 are respectively incident on the two photodetectors 3 and 4, the output currents of which are proportional to the instantaneous intensity of light $I_1(t)$ and $I_2(t)$ and are directed to the correlator unit 5. In correlator 5, a multiplier 6 takes the product of the two currents which is then integrated with respect to time by integrator 7. The output from the integrator 7 is a measure of the cross correlation existing between the photon distributions in the light beams 1 and 2. Photodetectors 3 and 4 may have time constants greater than the coherence time of the incident beams, which is usually on the order of $3 \times 10^{-10}$ seconds. Multiplier 6 can be any one of many well-known analog multipliers, while integrator 7 is shown by Hanbury-Brown and Twiss to be a motor having a linear relationship between speed and input voltage. Of course, any purely electronic integrating circuit may also be used.

According to the theory of Hanbury-Brown, Twiss, and others, the correlation coefficient between the light beams is given by the following formula:

$$<\Delta I_1 \Delta I_2> = \frac{\tau_c}{T}|\gamma_{12}|^2 <I_1><I_2> \qquad (1)$$

where $<\Delta I_1 \Delta I_2>$ is the correlation coefficient, $\tau_c$ is the coherence time of light, T is the response time of the detector $<I_1>$ and $<I_2>$ are the average values of light intensity at the inputs of the photodetectors 3 and 4, and $\gamma_{12}$ is the complex degree of coherence or normalized mutual coherence factor, for the light beams as measured between two points A and B, physically spaced $d$ distance apart, whereat detectors 3 and 4 are located. The $<>$ surrounding the values $I_1$ and $I_2$ indicate that the integral with respect to time (usually, the observation time) is taken of the instantaneous light beam intensities at the respective photodetectors in order to obtain their time average, i.e., $$\int_0^T I_1(t)dt = <I_1>$$

and $$\int_0^T I_2(t)dt = <I_2>$$

The fluctuations (or A.C. values) of the light beam intensities are given by $\Delta I_1 = I_1 - <I_1>$, and $\Delta I_2 = I_2 - <I_2>$. $\Delta I_1$ and $\Delta I_2$ are represented by the output currents from photodetectors 3 and 4, respectively, which are proportional thereto. Therefore, after multiplication and integration with respect to time, the output from integrator 7 is $<\Delta I_1 \Delta I_2>$, which, as defined above, is a measure of the correlation coefficient.

According to Principles of Optics, Born and Wolfe, Pergamon Press (1959), page 504 (hereinafter referred to as Publication C), the complex degree of coherence $\gamma_{12}$ for quasi-monochromatic light is defined to be the time average of the product of the wave amplitude of light at point A (FIGURE 1) and the complex conjugate of the wave amplitude of point B, divided by the product of the square roots of the intensities at these points. Thus, $$\gamma_{12} = \int_0^T V_1(t)V_2^*(t)dt/\sqrt{I_1}\sqrt{I_2} \qquad (2)$$

$$= <V_1 V_2^*>/\sqrt{I_1}\sqrt{I_2}$$

where $V_1(t)$ = wave amplitude of light at point A, $V_2^*(t)$ = complex conjugate of wave amplitude of light at point B, and $I_1$ and $I_2$ = intensities of light at points A and B, respectively. $\mu_{12}$ is also termed the phase coherence factor and it is a complex number having both real and imaginary parts. In polar coordinate form, therefore, $\gamma_{12}$ may be represented as $|\gamma_{12}|(\cos\phi + i\sin\phi)$, or $|\gamma_{12}|e^{i\phi}$, where $|\gamma_{12}|$ is the absolute value of $\gamma_{12}$ and is equal to the square root of the sum of the squares of the X and Y vectors, while $\phi$ is the phase angle that $|\gamma_{12}|$ makes with the X axis. Physically, the angle may be defined geometrically as on page 508 of Publication C, which is herein incorporated A and B, $|\gamma_{12}|=1$, while for fully incoherent light beams, $|\gamma_{12}|=0$. Therefore, for partially coherent light beams, $0 < |\gamma_{12}| < 1$.

It is therefore seen that while the original Hanbury-Brown and Twiss interferometer of FIGURE 1 provides a measure of the absolute value of $\gamma_{12}$ (since the correlation coefficient observed is proportional to $|\gamma_{12}|^2$), the phase $\phi$ of the phase coherence factor cannot be conveniently ascertained. Also, the shot noise in the optical region of the photodetectors, due to photoelectrons, is predominant over the wave interaction noise, so that all noise in the intensity interferometer of FIGURE 1 can be approximated by this shot noise which is given by $\langle \Delta I^2 \rangle = \langle I \rangle$. Therefore, the signal noise ratio of FIGURE 1 is proportional to $$S/N \alpha I_1 I_2 |\gamma_{12}|^2 / \sqrt{I_1 I_2} \quad (3)$$

Because $|\gamma_{12}|$ for partially coherent light is less than 1, the squaring of $|\gamma_{12}|$ results in a fairly low $S/N$ figure.

Because of the reasons stated previously, the phase of the complex degree of coherence yields valuable information, especially when determining intensity distribution of a source or the phase of an illuminated object. An intensity interferometer measuring both phase and amplitude of the factor $\gamma_{12}$ is the subject of the present invention, which provides a coherent background source for the interferometer of Hanbury-Brown and Twiss.

In the preceding discussion, the polarization characteristics of the incident light beams 1 and 2 were not investigated as to their effect upon the correlation coefficient $\langle \Delta I_1 \Delta I_2 \rangle$ when measured by the original Hanbury-Brown-Twiss interferometer shown in FIGURE 1. For the purpose of analyzing these characteristics, whose measurement may also be performed by the present invention, a more general equation is now given for the above-mentioned coefficient:

$$\langle I_1 \Delta I_2 \rangle = \frac{\tau_0}{T} |\gamma_{12}|^2 [\langle E_x^{(1)} E_x^{(1)*} \rangle \langle E_x^{(2)} E_x^{(2)*} \rangle$$
$$+ \langle E_y^{(1)} E_y^{(1)*} \rangle \langle E_y^{(2)} E_y^{(2)*} \rangle$$
$$+ |\mu_{xy}^{(1)}||\mu_{xy}^{(2)}| \{ \langle E_x^{(1)} E_x^{(1)*} \rangle \langle E_y^{(2)} E_y^{(2)*} \rangle$$
$$+ \langle E_y^{(1)} E_y^{(1)*} \rangle \langle E_x^{(2)} E_x^{(2)*} \rangle \}] \quad (4)$$

where $E_x^{(1)}$ and $E_y^{(1)}$ are the complex analytic signals respectively representing the X and Y components of the resultant E vector of incident beam 1 in FIGURE 2, $E_x^{(2)}$ and $E_y^{(2)}$ are the complex analytic signals respectively representing the X and Y components of the resultant E vector of incident beam 2, $\gamma_{12}$ is the normalized phase coherence factor previously defined, $\mu_{xy}^{(1)}$ is the measure of correlation between $E_x^{(1)}$ and $E_y^{(1)}$, $\mu_{xy}^{(2)}$ is the measure of correlation between $E_x^{(2)}$ and $E_y^{(2)}$, $\tau_0$ is the coherence time of light, and T is the time constant of the photodetectors. This equation is applicable for all degrees of polarization of incident beams 1 and 2, as will later be shown.

In order to understand and appreciate the significance of the terms used in Equation 4, reference will first be made to some fundamental concepts of light polarization. According to the electromagnetic wave theory of light, each single light wave is considered as a transverse wave whose electric vibrations E are in a straight line at right angle to its direction of propagation (see Fundamentals of Optics, Jenkins and White, 2d. edition, pages 486 et seq., hereafter referred to as Publication D). An ordinary beam of natural light consists of a number of such waves, each with its own plane of vibration, such that an electric vector may be found in any plane of the beam taken through its axis of propagation. A resultant electric vector E may be derived from the electric vectors of the waves making up said beam, whose end point moves quite irregularly with respect to time. Such a beam is considered to be completely unpolarized. This resultant electric vector may also be resolved into two electric vectors $E_x$ and $E_y$, respectively, vibrating in two planes X and Y at right angles to each other. These two vectors can be considered as representing two mutually perpendicular waves. Each vector $E_x$ and $E_y$ varies with time, and each can be considered as having a $\Omega_x$ and $\Omega_y$ with respect to some reference. Thus, the equations for these electric vectors may take the following form:

$$E_x(t) = a_1(t) e^{i[\Omega_x(t) - 2\pi\bar{\nu}t]} \quad (5)$$
$$E_y(t) = a_2(t) e^{i[\Omega_y(t) - 2\pi\bar{\nu}t]} \quad (6)$$

where $\bar{\nu}$ is the mean frequency, and $a_1$, $a_2$, $\Omega_x$, and $\Omega_y$ vary with time. It will be noted that both $E_x$ and $E_y$ above are complex quantities.

An unpolarized beam of light can be applied to a polarizing element which may cause either full or partial polarization of said beam. In a fully polarized beam, the end point of the electric vector E, which is the resultant of $E_x$ and $E_y$ (defined in Equations 5 and 6 above), varies regularly with time. Where certain conditions are present, this regular motion of a fully polarized beam may take the form of an ellipse (elliptically polarized), a circle (circularly polarized), or a straight line (linearly or plane polarized). In a partially polarized beam, the motion of the end point of the resultant E vector is neither completely regular nor completely irregular, with respect to time.

The nature of polarized light may be analytically investigated and characterized by the use of the coherency matrix as defined in Publication C, page 542. This matrix takes the following form:

$$J = \begin{vmatrix} \langle E_x E_x^* \rangle & \langle E_x E_y^* \rangle \\ \langle E_y E_x^* \rangle & \langle E_y E_y^* \rangle \end{vmatrix} \quad (7)$$

where $E_x$ and $E_y$ are complex quantities as defined in Equations 5 and 6. Thus, since a complex number multiplied by its conjugate is equal to the square of its absolute value, the coherency matrix (7) may also be represented in the following manner:

$$J = \begin{vmatrix} \langle a_1^2 \rangle & \langle a_1 a_2 e^{i(\Omega_x - \Omega_y)} \rangle \\ \langle a_1 a_2 e^{i(\Omega_x - \Omega_y)} \rangle & \langle a_2^2 \rangle \end{vmatrix} \quad (8)$$

For convenience, the elements of the coherency matrix may be represented by the following J terms:

$$J_{xx} = \langle E_x E_x^* \rangle = \langle a_1^2 \rangle \quad (9)$$
$$J_{yx} = \langle E_y E_x^* \rangle = \langle a_1 a_2 e^{i(\Omega_x - \Omega_y)} \rangle \quad (10)$$
$$J_{xy} = \langle E_x E_y^* \rangle = \langle a_1 a_2 e^{i(\Omega_x - \Omega_y)} \rangle \quad (11)$$
$$J_{yy} = \langle E_y E_y^* \rangle = \langle a_2^2 \rangle \quad (12)$$

The total intensity I of any beam is given by the square of the absolute value of its resultant E vector as follows:

$$I = |E|^2 \quad (13)$$

But, $|E|^2$ may be resolved as $$|E|^2 = |E_x|^2 + |E_y|^2 \quad (14)$$

Since the square of the absolute value of a complex number is equal to the complex number multiplied by its conjugate, then Equation 14 becomes $$|E|^2 = E_x E_x^* + E_y E_y^* \quad (15)$$

and Equation 13 becomes $$I = E_x E_x^* + E_y E_y^* = J_{xx} + J_{yy} \quad (16)$$

The elements of the coherency matrix may also be employed to represent the degree of correlation $\mu_{xy}$ between the components $E_x$ and $E_y$.

$$\mu_{xy} = |\mu_{xy}| e^{i(\Omega_x - \Omega_y)} = J_{xy}/\sqrt{J_{xx} J_{yy}} \quad (17)$$

The absolute value $|\mu_{xy}|$ is a measure of the degree of coherence between $E_x$ and $E_y$ and its phase $(\Omega_x-\Omega_y)$ is a measure of their effective phase difference. This phase difference may also be represented by the symbol $\beta$, such that $$\beta=\Omega_x-\Omega_y \qquad (18)$$

When light is fully polarized, $|\mu_{xy}|=1$, when unpolarized $|\mu_{xy}|=0$, and when partially polarized $0<|\mu_{xy}|<1$.

As noted previously, light may be either completely polarized, completely unpolarized, or partially polarized. The degree of polarization P is defined as the ratio of the intensity of the polarized portion to the total intensity, and may be represented by the elements of the coherency matrix in the following manner:

$$P=\sqrt{1-\frac{4(J_{xx}J_{yy}-J_{xy}J_{yx})}{(J_{xx}+J_{yy})^2}} \qquad (19)$$

When $P=1$, the light is said to be completely polarized. When $P=0$, it is completely unpolarized. When $0<P<1$, the light is partially polarized.

Since Equation 17 gives the relationship between the factor $\mu_{xy}$ and the elements of the coherency matrix, Equation 19 may also be expressed as follows:

$$P=\sqrt{1-\frac{4[J_{xx}J_{yy}1-|\mu_{xy}|^2]}{(J_{xx}+J_{yy})^2}} \qquad (20)$$

The foregoing discussion has been limited to an analysis of the coherency matrix for a single beam of light. In the case where two incident beams 1 and 2 of light are involved, as in the Hanbury-Brown-Twiss intensity interferometer of FIGURE 1, each such beam has its own coherency matrix consisting of elements $J_{xx}^{(1)}$, $J_{yy}^{(1)}$, $J_{xy}^{(1)}$, $J_{yx}^{(1)}$ for beam 1, and $J_{xx}^{(2)}$, $J_{yy}^{(2)}$, $J_{xy}^{(2)}$, $J_{yx}^{(2)}$ for beam 2. In addition, a coherency matrix with elements composed of $E_x$ and $E_y$ values of both beams may be derived in the following manner. Since $$\gamma_{12}=<E_1E_2^*>/\sqrt{I_1I_2}$$

[similar to Equation 2], where $E_1$ and $E_2$ are resultant E vectors of incident beams 1 and 2, respectively, then $$<\Delta I_1\Delta I_2>=\frac{T_c}{T}|\gamma_{12}|^2I_1I_2=|<E_1E_2^*>|^2 \qquad (21)$$

and $$|<E_1E_2^*>|^2=|<E_1>|^2|<E_2^*>|^2 \qquad (22)$$

Since $$|E_1|^2=|E_x^{(1)}|^2+|E_y^{(1)}|^2$$
$$|E_2^*|^2=|E_x^{(2)*}|^2+|E_y^{(2)*}|^2$$

then by multiplication of factors $$<\Delta I_1\Delta I_2>=\frac{T_c}{T}\{|<E_x^{(1)}E_x^{(2)*}>|^2+|<E_y^{(1)}E_y^{(2)*}>|^2$$
$$+|<E_x^{(1)}E_y^{(2)*}>|^2+|<E_y^{(1)}E_x^{(2)*}>|^2\} \qquad (23)$$

Equation 4, given previously, is actually the result of mathematically manipulating the terms of Equation 23 in a manner not shown herein.

In view of the foregoing brief description of light polarization, Equation 4 may also now be rewritten using the J elements of the coherency matrix for each of the incident beams 1 and 2.

$$<\Delta I_1\Delta I_2>=\frac{T_c}{T}|\gamma_{12}|^2[J_{xx}^{(1)}J_{xx}^{(2)}+J_{yy}^{(1)}J_{yy}^{(2)}$$
$$+|\mu_{xy}^{(1)}||\mu_{xy}^{(2)}|(J_{xx}^{(1)}J_{yy}^{(2)}+J_{yy}^{(1)}J_{xx}^{(2)})] \qquad (24)$$

Equation 24 will now be examined for the cases where incident beams 1 and 2 are both (A) completely unpolarized, (B) fully linearly polarized, and (C) fully elliptically or circularly polarized. In all cases, incident beams 1 and 2 are considered partially coherent as evidenced by the fact that $|\gamma_{12}|>0$.

For case (A), there is no correlation between $E_x^{(1)}$ and $E_y^{(1)}$, or between $E_x^{(2)}$ and $E_y^{(2)}$. Therefore $$|\mu_{xy}^{(1)}|=|\mu_{xy}^{(2)}|=0, \quad J_{xx}^{(1)}=J_{yy}^{(1)}=\tfrac{1}{2}I_1,$$

and $J_{xx}^{(2)}=J_{yy}^{(2)}=\tfrac{1}{2}I_2$. Substituting these values into Equation 24, it becomes $$<\Delta I_1\Delta I_2>=\tfrac{1}{2}\frac{T_c}{T}I_1I_2|\gamma_{12}|^2 \qquad (25)$$

Equation 25 should be compared with Equation 1 which it generally resembles and which is the result found by Hanbury-Brown and Twiss with their original intensity interferometer.

For case (B), assume that $E_x^{(1)}$ and $E_x^{(2)}$ are present, while $E_y^{(1)}$ and $E_y^{(2)}$ equal 0. Thus $|\mu_{xy}^{(1)}|=|\mu_{xy}^{(2)}|=1$, $J_{xx}^{(1)}=I_1$, $J_{yy}^{(1)}=0$, $J_{xx}^{(2)}=I_2$ and $J_{yy}^{(2)}=0$. Equation 24 thereby becomes $$<\Delta I_1\Delta I_2>=\frac{T_c}{T}|\gamma_{12}|^2I_1I_2 \qquad (26)$$

which should again be compared with Equation 1. The result follows when $E_y^{(1)}$ and $E_y^{(2)}$ are assumed present, with $E_x^{(1)}$ and $E_x^{(2)}$ equal to 0.

For case (C), $$J_{xx}^{(1)}=J_{yy}^{(1)}=\tfrac{1}{2}I_1, \quad J_{xx}^{(2)}=J_{yy}^{(2)}=\tfrac{1}{2}I_2$$

and $$|\mu_{xy}^{(1)}|=|\mu_{xy}^{(2)}|=1$$

Equation 24 then becomes $$<\Delta I_1\Delta I_2>=\frac{T_c}{T}|\gamma_{12}|^2I_1I_2 \qquad (27)$$

Where the incident beams 1 and 2 are partially polarized, then the specific values of the J coherency matrix elements do not have the simple relationships shown above for cases (A), (B), and (C).

When the incident beams 1 and 2 are a part of a uniform plane wave whose degree of polarization is the same over the wave front, then $I_1=I_2=I$, and $P_1$ (the degree of polarization of incident beam 1)$=P_2$ (the degree of polarization of incident beam 2)$=P$. In this instance, Equation 24 can be reduced to $$<\Delta I_1\Delta I_2>=\tfrac{1}{2}\frac{T_c}{T}|\gamma_{12}|^2I^2(1+P^2) \qquad (28)$$

In Equation 28, when the incident beam is completely unpolarized, then $P=0$, and Equation 28 reduces to Equation 25 in case (A).

It is thus apparent from the foregoing, especially Equation 24, that the correlation measurement of the original Hanbury Brown-Twiss intensity interferometer yields information only about the absolute value of $\mu_{xy}^{(1)}$ and $\mu_{xy}^{(2)}$, but nothing about their respective phases $\beta_1$ and $\beta_2$. This additional information, however, may be measured according to the principles of the present invention, by providing this intensity interferometer with a fully polarized coherent background source such as is shown in FIGURE 2. In addition, as previously mentioned, the phase $\phi$ of the phase coherence factor $\gamma_{12}$ may also be ascertained by this invention.

FIGURE 2 shows a generalized block diagram of the present invention which will be used when describing the theory of operation. A beam of light 15 generated from a coherent source 10 is supplied to both input channels of the original Hanbury Brown-Twiss interferometer as composed of photodetectors 163, 164, and correlator 165. Beam 15, which normally emerges from source 10 in a completely unpolarized state, is first directed through a linear polarizing element 154. Element 154 transforms the unpolarized coherent beam 15 into a linearly polarized beam 16, whose angle of polarization is $\alpha$ when measured, for example, with respect to the X axis of incident light beam 1. The angle $\alpha$ may be varied according to the procedure subsequently to be described. Linearly polarized beam 16 is then equally divided into two separate beams 155 and 156 by a phase shifter 17 so that a phase difference of $\theta$ exists therebetween. The value of $\theta$ may be varied in a manner subsequently to be explained. Each beam 155 and 156 should have the same intensity $I_0$. Beam 155 is then directed through a compensator 160 which retards its $E_y$ component by a phase $\epsilon_1$, after which said beam 155 (having intensity $I_0$) is superimposed on incident beam 1 (having intensity $I_1$) at photodetector 163. The resultant beam falling on detector 163 therefore has an intensity $I_1 + I_0$. In similar fashion, beam 156 is directed through a compensator 162 which retards its $E_y$ component by a phase $\epsilon_2$, after which said beam 155 is superimposed on incident beam 2 (making a resultant beam of intensity $I_2 + I_0$) at photodetector 164. Phases $\epsilon_1$ and $\epsilon_2$ are also variable. The coherent light background 10 should preferably be a stable monochromatic point source whose intensity is as high or higher than the incoming beams 1 and 2. In practice this coherent background may be provided by a mercury (Hg) 198 lamp commercially available having a spectrum of approximately 5461A. The best source for this purpose would actually be a continuous wave optical maser.

The operation of FIGURE 2 will now be described by beginning with an analysis of the effect of the superimposed coherent background beams 155 and 156 on the incident beams 1 and 2, respectively, as regards the change in Equation 23. Coherent beam 155 which may be considered as one half of beam 15, is normally completely unpolarized before it is transmitted through linear polarizer 154, after which the motion of the end point of its resultant vector $E_0^{(1)}$ defines a straight line making an angle $\alpha$ with respect to some reference such as the X axis of incident beam 1. This resultant vector $E_0^{(1)}$ may be resolved into component vectors $E_{x0}^{(1)}$ and $E_{y0}^{(1)}$ which also lie on the incident beam 1 X and Y axes, and which are defined as follows:

$$E_{x0}^{(1)} = E_0^{(1)} \cos \alpha \qquad (29)$$

$$E_{y0}^{(1)} = E_0^{(1)} \sin \alpha \qquad (30)$$

When the linearly polarized coherent beam 155 is next passed through compensator 160, its component $E_{y0}^{(1)}$ vector is retarded (delayed) by an amount $\epsilon_1$ with respect to the $E_{x0}^{(1)}$ vector. Furthermore, since $E_0^{(1)2} = I_0$ (the intensity of coherent beam 155), then $E_0 = \sqrt{I_0}$. Thus, in view of the foregoing, the component vectors $E_{x0}^{(1)}$ and $E_{y0}^{(1)}$ which are superposed on incident beam 1, are defined as follows:

$$E_{x0}^{(1)} = \sqrt{I_0} \cos \alpha \qquad (31)$$

$$E_{y0}^{(1)} = \sqrt{I_0} \sin \alpha e^{-i\epsilon_1} \qquad (32)$$

In like fashion, the equations for the $E_{x0}^{(2)}$ and $E_{y0}^{(2)}$ vectors of coherent beam 156, which are superimposed on incident beam 2 at photodetector 164, may be derived as above. However, since coherent beam 156 is out of phase by $\theta$ with coherent beam 155, due to phase shifter 17, this variable must be taken into consideration. Therefore, $$E_{x0}^{(2)} = \sqrt{I_0} \cos \alpha e^{-i\theta} \qquad (33)$$

$$E_{y0}^{(2)} = \sqrt{I_0} \sin \alpha e^{-i(\epsilon_2 + \theta)} \qquad (34)$$

The correlation between only the coherent beams 155 and 156, when they respectively arrive at photodetectors 163 and 164, may take a form similar to that of Equation 23 which itself considered only the incident beams 1 and 2. Thus $$\langle \Delta I_0 \Delta I_0 \rangle = \frac{T_c}{T} \{ |\langle E_{x0}^{(1)} E_{x0}^{(2)*} \rangle|^2 + |\langle E_{x0}^{(1)} E_{y0}^{(2)*} \rangle|^2$$

$$+ |\langle E_{y0}^{(1)} E_{x0}^{(2)*} \rangle|^2 + |\langle E_{y0}^{(1)} E_{y0}^{(2)*} \rangle|^2 \qquad (35)$$

where $\langle \Delta I_0 \Delta I_0 \rangle$ is the correlation between the coherent beams 155 and 156 at photodetectors 163 and 164, each beam having an intensity $I_0$.

The measured correlation at the output of the correlator in FIGURE 2, when considering the effect of the superimposed incident and coherent beams at each photodetector, may be represented by the primed term $\langle \Delta I_1^1 \Delta I_2^1 \rangle$ to distinguish it from the term $\langle \Delta I_1 \Delta I_2 \rangle$ in Equation 23. To express the correlation coefficient $\langle \Delta I_1^1 \Delta I_2^1 \rangle$ in the form of Equation 23, it is merely necessary to add together the corresponding terms, in their unsquared form, of Equations 23 and 35, then square each of the resulting terms. This is permissible because an incident beam and a superposed coherent background are mutually independent, since they originate from entirely different sources. Thus, $$\langle \Delta I_1^1 \Delta I_2^1 \rangle = \frac{T_c}{T} \{ |\langle E_x^{(1)} E_x^{(2)*} \rangle + \langle E_{x0}^{(1)} E_{x0}^{(2)*} \rangle|^2$$

$$+ |\langle E_x^{(1)} E_y^{(2)*} \rangle + \langle E_{x0}^{(1)} E_{y0}^{(2)*} \rangle|^2$$

$$+ |\langle E_y^{(1)} E_x^{(2)*} \rangle + \langle E_{y0}^{(1)} E_{x0}^{(2)*} \rangle|^2$$

$$+ |\langle E_y^{(1)} E_y^{(2)*} \rangle + \langle E_{y0}^{(1)} E_{y0}^{(2)*} \rangle|^2 \} \qquad (36)$$

In Equation 36, each of the terms $E_{x0}^{(1)}$, $E_{x0}^{(2)}$, $E_{y0}^{(1)}$ and $E_{y0}^{(2)}$ can be represented as in Equations 31, 32, 33, and 34, respectively, while their complex conjugates are formed by changing the signs of their exponents. Therefore, Equation 36 can be written as $$\langle \Delta I_1^1 \Delta I_2^1 \rangle = \frac{T_c}{T} \{ |\langle E_x^{(1)} E_x^{(2)*} \rangle + I_0 \cos^2 \alpha e^{i\theta}|^2$$

$$+ |\langle E_x^{(1)} E_y^{(2)*} \rangle + I_0 \cos \alpha \sin \alpha e^{i(\theta + \epsilon_2)}|^2$$

$$+ |\langle E_y^{(1)} E_x^{(2)*} \rangle + I_0 \cos \alpha \sin \alpha e^{i(\theta - \epsilon_1)}|^2$$

$$+ |\langle E_y^{(1)} E_y^{(2)*} \rangle + I_0 \sin^2 \alpha e^{i(\theta + \epsilon_2 - \epsilon_1)}|^2 \} \qquad (37)$$

Equation 37 may also be put in the following form so as to indicate the effect of the terms $\gamma_{12}$, $\mu_{xy}^{(1)}$ and $\mu_{xy}^{(2)}$ on the correlation measurement.

$$\langle \Delta I_1^1 \Delta I_2^1 \rangle = \frac{T_c}{T} \{ |\sqrt{J_{xx}^{(1)} J_{xx}^{(2)}} \gamma_{12} + I_0 \cos^2 \alpha e^{i\theta}|^2$$

$$+ |\sqrt{J_{xx}^{(1)} J_{yy}^{(2)}} \gamma_{12} R e^{i\beta_2} + I_0 \sin \alpha \cos \alpha e^{i(\theta + \epsilon_2)}|^2$$

$$+ |\sqrt{J_{yy}^{(1)} J_{xx}^{(2)}} \gamma_{12} R e^{-i\beta_1} + I_0 \sin \alpha \cos \alpha e^{i(\theta - \epsilon_1)}|^2$$

$$+ |\sqrt{J_{yy}^{(1)} J_{yy}^{(2)}} \gamma_{12} e^{i(\beta_2 - \beta_1)} + I_0 \sin \alpha e^{i(\theta + \epsilon_2 - \epsilon_1)}|^2 \} \qquad (38)$$

where $R = |\mu_{xy}^{(1)}| = |\mu_{xy}^{(2)}|$,
$\beta_1$ = phase of $\mu_{xy}^{(1)}$ and
$\beta_2$ = phase of $\mu_{xy}^{(2)}$ By using the intensity interferometer of FIGURE 2, it is now desired to measure the phase information contained in $\gamma_{12}$, $\mu_{xy}^{(1)}$, and $\mu_{xy}^{(2)}$, which may be respectively represented by $\phi$, $\beta_1$, and $\beta_2$. This information is not measurable with the original Hanbury Brown-Twiss interferometer, as may be ascertained by an examination of Equation 24.

*Step 1.*—First, set angle $\alpha$ of polarizer 154 equal to zero, and then vary angle $\theta$ of phase shifter 17 until a maximum signal $\langle \Delta I_1^1 \Delta I_2^1 \rangle$ is detected at the output of correlator 165. In Equation 38, all terms containing sin $\alpha$ will vanish, and the term $I_0 \cos^2 \alpha e^{i\theta}$ now equals $I_0 e^{i\theta}$. Therefore, any change in the correlator output $\langle \Delta I_1^1 \Delta I_2^1 \rangle$ is dependent only upon a change in the value of $$\frac{T_c}{T} |\sqrt{J_{xx}^{(1)} J_{xx}^{(2)}} \gamma_{12} + I_0 e^{i\theta}|^2$$

which may be conveniently represented by the symbol $F_1(\theta)$. Since the square of the absolute value of a complex number is equal to the product of that number and its complex conjugate, this function $F_1(\theta)$ can also be expressed as follows:

$$F_1(\theta) = \frac{T_c}{T} \{ (\sqrt{J_{xx}^{(1)} J_{xx}^{(2)}} \gamma_{12} + I_0 e^{i\theta})(\sqrt{J_{xx}^{(1)} J_{xx}^{(2)}} \gamma_{12}^* + I_0 e^{-i\theta}) \}$$

$$= \frac{T_c}{T} \{ J_{xx}^{(1)} J_{xx}^{(2)} \gamma_{12} \gamma_{12}^* + I_0^2 e^{i(\theta - \theta)} + I_0 \sqrt{J_{xx}^{(1)} J_{xx}^{(2)}} (e^{i\theta} \gamma_{12}^* + e^{-i\theta} \gamma_{12}) \}$$

$$= \frac{T_c}{T} \{ J_{xx}^{(1)} J_{xx}^{(2)} |\gamma_{12}|^2 + I_0^2 + I_0 \sqrt{J_{xx}^{(1)} J_{xx}^{(2)}} (e^{i\theta} \gamma_{12}^* + e^{-i\theta} \gamma_{12}) \}$$

$$(39)$$

In Equation 39, $$(e^{i\theta}\gamma_{12}{}^* + e^{-i\theta}\gamma_{12}) = e^{i\theta}(|\gamma_{12}|e^{-i\phi}) + e^{i\theta}(|\gamma_{12}|e^{i\phi})$$
$$= |\gamma_{12}|e^{i(\theta-\phi)} + |\gamma_{12}|e^{-i(\theta-\phi)}$$
$$= |\gamma_{12}|(e^{i(\theta-\phi)} + e^{-i(\theta-\phi)}) \quad (40)$$

Since $e^{ix} = \cos x + i \sin x$, then $$(e^{i\theta}\gamma_{12}{}^* + e^{i\theta}\gamma_{12}) = |\gamma_{12}|\{[\cos(\theta-\phi) + i\sin(\theta-\phi)]$$
$$+ [\cos(\theta-\phi) - i\sin(\theta-\phi)]\}$$
$$= 2|\gamma_{12}|\cos(\theta-\phi) \text{ or } 2[\gamma_{12}e^{-i\theta}]^R \quad (41)$$

where the superscript R signifies that only the real term of the expanded bracketed value need be considered.

Thus, Equation 39 becomes $$F_1(\theta) = \frac{\tau_0}{T}\{J_{xx}{}^{(1)}J_{xx}{}^{(2)}|\gamma_{12}|^2 + I_0{}^2 + 2I_0|\gamma_{12}|\sqrt{J_{xx}{}^{(1)}J_{xx}{}^{(2)}}\cos(\theta-\phi)\}$$
$$(42)$$

From Equation 42 it may be understood that in Step 1, any variation in the correlator ouput $\langle \Delta I_1{}^1 \Delta I_2{}^1 \rangle$ depends only upon the change in the angle $\theta$, since it can be assumed that the values $J_{xx}{}^{(1)}$, $J_{xx}{}^{(2)}$, $|\gamma_{12}|$ and $I_0$ remain constant. Therefore, the maximum output signal from the correlator is obtained when the phase $\phi$ of phase coherence factor $\gamma_{12}$ is cancelled by the phase difference $\theta$ between the two coherent background beams 155 and 156. This is so, because when $\theta - \phi = 0$, $\cos(\theta-\phi) = 1$. A minimum correlator output is similarly obtained when $\theta - \phi = \pi$, or an odd number multiple of $\pi$, since $\cos \tau = -1$. In the first of these cases, therefore, the term $2I_0|\gamma_{12}|\sqrt{J_{xx}{}^{(1)}J_{xx}{}^{(2)}}\cos(\theta-\phi)$ is added to the other two terms in Equation 42, while in the second, this term is negative. By this technique, then, the phase $\phi$ of $\gamma_{12}$ may be ascertained, since $\theta$ is varied until maximum output is obtained at which time $\phi = \theta$. If the minimum output is subtracted from the maximum output, and the difference divided by two $$\frac{\text{MAX} - \text{MIN}}{2}$$

then the quantity $|\gamma_{12}|\sqrt{J_{xx}{}^{(1)}J_{xx}{}^{(2)}}$ can be found when $I_0$ is known.

*Step 2.*—Next, set $\alpha = \pi/2$, set $\epsilon_1 = \epsilon_2 = 0$, and vary $\theta$ until maximum signal output is obtained. In this case, all terms in Equation 38 containing $\cos \alpha$ will equal zero, and $\langle \Delta I_1{}^1 \Delta I_2{}^1 \rangle$ varies only according to the quantity $$\frac{\tau_0}{T}\{|\langle \sqrt{J_{yy}{}^{(1)}J_{yy}{}^{(2)}}\gamma_{12}e^{i(\beta_1-\beta_2)} + I_0 e^{i\theta}\rangle|^2\}$$

After expanding this quantity in the fashion of Step 1, the only varying quantity therein (as $\theta$ varies) is $$2I_0\sqrt{J_{yy}{}^{(1)}J_{yy}{}^{(2)}}|\gamma_{12}|\cos[\theta - (\beta_1-\beta_2) - \phi]$$

A maximum signal $\langle \Delta I_1{}^1 \Delta I_2{}^1 \rangle$ is therefore obtained when $[\theta - (\beta_1-\beta_2) - \phi] = 0$, while a minimum signal occurs for $\cos \pi$. Since the value of $\phi$ was found in Step 1 above, and $\theta$ is known, the value of $(\beta_2 - \beta_1)$ can be determined. This difference is called $\beta_0$. Step 2 also gives the value of $|\gamma_{12}|\sqrt{J_{yy}{}^{(1)}J_{yy}{}^{(2)}}$ by the use of the formula $$\frac{\text{MAX} - \text{MIN}}{2}$$

*Step 3.*—Fix now the value $\theta$ equal to $\phi$, and $\alpha = \pi/4$. Vary both $\epsilon_1$ and $\epsilon_2$ in such a fashion that the difference $\epsilon_2 - \epsilon_1$, always equals the difference $\beta_2 - \beta_1$, or $\beta_0$, which was measured in Step 2. Therefore, the output $$\langle \Delta I_1{}^1 \Delta I_2{}^1 \rangle$$

varies only according to the second and third terms $$|\sqrt{J_{xx}{}^{(1)}J_{yy}{}^{(2)}}\gamma_{12}R_e{}^{i\beta_2} + I_0 \sin\alpha \cos\alpha e^{i(\phi+\epsilon_2)}|^2$$
and
$$|\sqrt{J_{yy}{}^{(1)}J_{xx}{}^{(2)}}\gamma_{12}R_e{}^{i\beta_1} + I_0 \sin\alpha \cos\alpha e^{i(\phi-\epsilon_1)}|^2$$

in Equation 38. This is so because the variables $\epsilon_1$ and $\epsilon_2$ do not appear in the first term, and the phase differences $(\beta_2 - \beta_1)$ and $(\epsilon_2 - \epsilon_1)$ cancel out in the square of the fourth term because they are equal. After squaring the second and third terms, it is seen that $\langle \Delta I_1{}^1 \Delta I_2{}^1 \rangle$ varies only according to $$\frac{\tau_0}{T}\{2I_0 \sin\alpha \cos\alpha R\sqrt{J_{xx}{}^{(1)}J_{yy}{}^{(2)}}|\gamma_{12}|\cos(\theta+\epsilon_2-\beta_2-\phi)$$

$$+ 2I_0 \sin\alpha \cos\alpha R\sqrt{J_{yy}{}^{(1)}J_{xx}{}^{(2)}}|\gamma_{12}|\cos(\theta-\epsilon_1+\beta_1-\phi)\}$$

Because $\theta$ has been set equal to $\phi$, the above two cosine expressions reduce to $\cos(\epsilon_2 - \beta_2)$ and $\cos(\beta_1 - \epsilon_1)$. Since $\epsilon_2 = \beta_0 + \epsilon_1$, and $\beta_2 = \beta_0 + \beta_1$, these two cosine expressions are seen to be identical, such that the value of $$\langle \Delta I_1{}^1 \Delta I_2{}^1 \rangle$$

varies according to the magnitude of $\cos(\epsilon_1 - \beta_1)$. Therefore when $\epsilon_1 = \beta_1$, maximum signal is obtained. $\beta_2$ can then be calculated, since it is $\beta_0 - \beta_1$. By measuring maximum and minimum values, the values $$|\gamma_{12}|R\sqrt{J_{xx}{}^{(1)}J_{yy}{}^{(2)}}$$
and
$$|\gamma_{12}|R\sqrt{J_{yy}{}^{(1)}J_{xx}{}^{(2)}}$$

are found, inasmuch as the values $\sin\alpha$ and $\cos\alpha$ are known.

It should further be appreciated from the foregoing discussion that the squaring of the measured terms $$|\gamma_{12}|\sqrt{J_{xx}{}^{(1)}J_{xx}{}^{(2)}} \quad \text{(Step 1)}$$
$$|\gamma_{12}|\sqrt{J_{yy}{}^{(1)}J_{yy}{}^{(2)}} \quad \text{(Step 2)}$$
and
$$|\gamma_{12}|R\sqrt{J_{xx}{}^{(1)}J_{yy}{}^{(2)}}, |\gamma_{12}|R\sqrt{J_{yy}{}^{(1)}J_{xx}{}^{(2)}} \quad \text{(Step 3)}$$

together with their summation, results in Equation 24, which is used to describe the polarization characteristics of incident beams 1 and 2.

FIGURE 3 shows details of a preferred embodiment of the invention which mechanizes the functions shown by FIGURE 2. Corresponding light beams and subcombinations are numbered alike in the two figures. The completely unpolarized light from coherent source 10 is passed through any well known fixed linear polarizer 154 and emerges with its resultant vector E at right angles to the sheet, such as is indicated by the small circles. The angle of polarization $\alpha$ of beam 16 is defined to be equal to zero with respect to the $E_x$ vectors of incident beams 1 and 2. The variable phase shifter 17 is comprised of a half-silvered mirror 200 which receives the linearly polarized coherent light beam 16 and divides it into two beams 155 ad 156 having equal intensity. Beam 156 is directed to another mirror 201 which in turn reflects said beam towards a movable mirror 202. Mirror 202 is movable by means 203 in either direction $\Delta_x$ shown by the arrow, such that the distance traversed by beam 156, in going to and returning from, mirror 202, can be changed. Thus, the phase $\theta$ between beams 155 and 156 can be varied by moving the mirror 202 a fraction of a wavelength. After returning from mirror 202, beam 156 emerges from unit 17. Since beams 16 and 156 strike their respective mirror surfaces with their E vectors parallel thereto, there is no change in the angle of polarization as originally produced by 154.

Beams 155 and 156 are respectively directed to half-silvered mirrors 204 and 205 which reflect a portion of their incident beams up to strike a photodetector 206. The purpose of mirrors 204, 205, and photodetector 206 will be explained at a later time, since they are included in FIGURE 3 merely to simplify the problem of measuring angle $\theta$ in the above-described Step 1 operation. Beams 155 and 156, which emerge from mirrors 204 and 205, are still equal but diminished in intensity and are then respectively directed to half-silvered mirrors 207 and 208 in compensators 160 and 162, respectively. In compensator 160, beam 155 is divided into two beams 209 and 210 of equal intensity, with beam 210 being directed to mirror 211 and thence to a movable mirror 212. After being reflected from mirror 212, beam 210 is directed toward mirror 213 where a portion is reflected upwards to a photodetector 214. Beam 209 is directed to mirror 215 where a portion is also reflected upwards to photodetector 214. The purpose of mirrors 213 and 215, together with photodetector 214, is to simplify the procedure of Step 3 above, as will be subsequently explained.

In compensator 162, a similar operation occurs in that beam 156 is divided into two beams 216 and 217, with beam 216 being reflected from mirror 218 and a movable mirror 219. However, no mirrors need be included having a function similar to mirrors 213 and 215 in compensator 160, except as a possible way to equalize the intensities of beams 217 and 216 with those of the emerging beams 209 and 210. It will further be noted that each beam 209, 210, 216, and 217 has the same angle of polarization.

Beams 209 and 210 are next passed through respective shutters 220 and 221 in compensator 160, while beams 216 and 217 are passed through respective shutters 222 and 223 in compensator 162. Shutters 220, 221, 222, and 223 can each be selectively opened or closed so as to pass or block their respective beams. After passing through shutter 221, beam 210 is next passed through a one-half wave plate 224 which rotates its E vector by 90 degrees, as indicated by the vertical lines. In compensator 162, beam 216 is likewise passed through a one-half wave plate 225 which rotates its E vector by 90 degrees. Beam 209 is reflected from mirror 226 and then mirror 227 where it is combined with the vertically polarized beam 210 to form the final output beam 155'. Beam 217 is likewise reflected by mirrors 228 and 229 to combine with vertically polarized beam 216 and form beam 156'.

In compensator 160, beam 209 may be considered as the $E_{x0}^{(1)}$ component of beam 155, while beam 210 is the $E_{y0}^{(1)}$ component thereof. By moving the mirror a fraction of a wavelength, the $E_{y0}^{(1)}$ component may be delayed by any phase $\epsilon_1$ with respect to the component. In like fashion, by moving the mirror 219 in compensator 162 by a fraction of a wavelength, the $E_{y0}^{(2)}$ component (beam 216) is delayed by phase $\epsilon_2$ with respect to the $E_{x0}^{(2)}$ component (beam 217).

Light beam 1 is reflected by mirrors 230 and 231 to combine with coherent beam 155 before impinging on photodetector 163. Light beam 2 is likewise reflected by mirrors 232 and 233 to combine with beam 156 before impinging on photodetector 164. The signal generated by each of the photodetectors, which represents the intensity of the total light incident thereon, is then applied to a multiplier 234 in correlator unit 165. The product therefrom is then applied via a tuned amplifier 235 to one winding of an integrating circuit, such as a two-phase motor 236. The output of the integrator, as measured by its r.p.m., is indicative of the value $<I_1^1 \Delta I_2^1>$ as defined, for example, in Equation 37. The input to the other winding of two-phase motor 236 is seen to come from a variable phase shifter 237, although this is so only because of a synchronous detection technique which is used to eliminate problems in measuring very small phase values.

The operation of FIGURE 3 may now be briefly described, neglecting the structure specifically designed to measure the angles $\theta$ etc. Step 1 of the above-described procedure is performed by first closing shutters 221 and 222 such that the coherent beams 155 and 156 are composed only of respective beams 209 and 217 each of which has an angle of polarization $\alpha$ equal to zero. Then, mirror 202 is slowly moved, thus changing $\theta$, to obtain maximum and minimum outputs from motor 236. For Step 2 of the procedure, shutters 220 and 223 are closed such that the angle $\alpha$ of beams 155 and 156 is equal to $\pi/2$ because each is respectively composed of only beams 210 and 216. Also, mirrors 212 and 219 are each moved such that beams 210 and 216 are delayed by equal amounts (or where any difference in delay is a multiple of the wavelength) with respect to their respective beams 209 and 216, thus insuring the $\epsilon_1 = \epsilon_2$. Then, mirror 202 is moved to vary $\theta$ and consequently obtain maximum and minimum values from motor 236.

In Step 3, mirror 202 is moved to a position where $\theta = \phi$. Also, shutters 220, 221, 222, and 223 are opened so that beams 209, 210, 216, and 217 may all pass therethrough, with equal intensity. This results in $\alpha = \pi/4$. Then, mirrors 212 and 219 are each set relative to each other such that $\epsilon_2 - \epsilon_1 = \beta_0$. Then, mirrors 212 and 219 are simultaneously moved, still keeping the fixed relationship between them of $\epsilon_2 - \epsilon_1 = \beta_0$, so as to obtain maximum and minimum outputs from the motor 236.

Although mirrors 202, 212, and 219 can in theory be moved and set to any value of $\theta$, $\epsilon_1$ and $\epsilon_2$, respectively, the exact measurement of these angles may be difficult due to the extremely small values of $\Delta x$ and wavelength $\lambda$ of the coherent light. A more practical scheme for accomplishing the procedure of Steps 1, 2, and 3 is to provide the additional structure for synchronous detection. As before noted, a portion of each of the beams 155 and 156 is deflected upwards from respective mirrors 204 and 205 to the photodetector 206. During Steps 1 and 2, switch 239 is closed to connect photodetector 206 to the tuned amplifier 238, which in turn is connected to the variable phase shifter 237. Means 203 may be adapted to slowly move mirror 202 continuously in the same direction $\Delta x$ for the duration of observation during Steps 1 and 2. The consequent continuous change in phase of beam 156, with respect to beam 155, causes an interference effect at photodetector 206, which, via tuned amplifier 238, generates a low frequency signal A $$(1+ \cos \omega t)$$

where $\omega t = \theta$, and $$\omega = 2\pi \frac{dx}{dt}$$

such that angle $\theta$ is modulated with respect to time. Phase shifter 237 varies the phase of this low frequency signal A $(1+ \cos \omega t)$ by an amount $\psi$, such that the output therefrom is $A[1+ \cos (\omega t + \psi)]$ which is then applied to motor 236. Inasmuch as the modulated beam 156 is also applied to photodetector 164, the output from the multiplier 234, as expressed in Equation 42, for example, varies according to $$2I_0|\gamma_{12}|\sqrt{J_{xx}^{(1)} J_{xx}^{(2)}} \cos (\omega t - \phi)$$

since $\theta = \omega t$. Tuned amplifier 235 is provided to pass this component to the other input of two-phase motor 236. Thus, the term $\omega t$ in both inputs to motor 236 will cancel so that the torque therein is proportional to $\cos (\phi - \psi)$, where $\phi$ is the phase angle of $\gamma_{12}$. Therefore, by observing the maximum degree of motor rotation, which occurs when $\cos (\phi - \psi) = 1$, the angle $\phi$ can be determined by noting the value of $\psi$. The advantage of measuring phase $\psi$ instead of $\theta$ is that the former is easily obtained from any well known calibrated electronic phase shifter 237 which operates on low frequency signals. In Step 2, the modulation of phase $\theta$ and changing of phase $\psi$ causes the output of the multiplier to vary according to $$\cos [\phi - (\beta_1 - \beta_2) - \psi]$$

During Step 3, angle $\theta$ is held constant while $\epsilon_1$ and $\epsilon_2$ are both varied. Synchronous detection may be employed during this step also by moving both mirrors 212 and 219 at the same speed in one direction $\Delta x$ by means 240, which thereupon modulates $\epsilon_1$ and $\epsilon_2$. However, it must be remembered that these mirrors must remain in the same fixed relationship to each other at this time. Switch 239 is set to now connect photodetector 214 to phase shifter 237. The beating of beams 209 and 210 at photodetector 214 causes a signal A $(1+ \cos \omega t)$ to be generated therefrom, where $\omega t = \epsilon_1$. By varying $\psi$ until maximum output is obtained, then $\beta_1$ can be determined.

Instead of using the two-phase integrating motor 236, the same procedure may also be realized by a synchronous detector and integrating network, where the signal from multiplier 234 is detected under the presence of the signal from phase shifter 237. Such a circuit is shown in FIGURE 4, and may include a quarter square multiplier 250 such as is shown and described on page 281 of "Electronic Analog Computers," Korn and Korn, McGraw-Hill Publishing Co. (2d ed.) 1956. This multiplier is responsive to the outputs from amplifier 235 and phase shifter 237 in FIGURE 3 to generate a signal proportional to their product, which in effect is the function also of motor 236. In order to eliminate higher order harmonics in this output, amplifier 251 may be provided having an upper cutoff frequency less than the value ω. The output therefrom is then applied to some form of integrator 252, such as the well known capacitor type, for generating the final output signal over the observing time interval.

In the event that the maximum distance Δx in FIGURE 3 is traversed before significant output results are obtained from the intensity interferometer, the direction of motion of mirrors 202, 212–219 may be reversed if the phase ψ of shifter 237 is likewise changed in polarity. Using this procedure, the observation time may be extended indefinitely until a valid measurement is made.

It should be appreciated that the detailed operation of FIGURE 3 is slightly different from the general discussion of the invention as illustrated by FIGURE 2. For example, in FIGURE 2, the linear polarizer has a variable angle α, while in FIGURE 3 the angle of the light vector emerging from the polarizer is fixed, with shutter means being provided in each compensator to vary α from 0 to π/2 to π/4. FIGURE 3 therefore provides one practical way, although not the only way, to avoid any undesirable change in the angle of linear polarization, which change could be caused by a beam striking a mirror surface in such a manner that its resultant vector is not parallel thereto. Furthermore, it is possible to linearly polarize at the same angle α by a polarizer in each channel, each coherent portion *after* it leaves the coherent background beam splitting arrangement, instead of linearly polarizing the coherent background prior to their formation, the latter arrangement being shown in FIGURE 2. However, again the mirrors must be arranged so as to avoid any change in angle due to reflection of the beam therefrom. Other arrangements for performing the above-described measuring steps may obviously be provided. Therefore, while a preferred embodiment of the invention has been shown and described, modifications thereto may occur to one skilled in the art without departing from the spirit of the invention as expressed in the appended claims.

What is claimed is:

1. Apparatus for the measurement of the phase between the vectors and the phase angle of the phase coherence factor of first and second partially coherent beams, comprising in combination: a first photodetector means upon which said first light beam impinges, a second photodetector means upon which said second light beam impinges, a coherent background source of light, first means for dividing said coherent background into first and second portions, second means for selectively varying the phase relationship $\theta$ between said first and second coherent portions, third means for linearly polarizing said first and second coherent portions both at the same angle α, means for selectively varying said angle α, fourth means for selectively retarding the phase $\epsilon_1$ between the $E_x$ and $E_y$ vectors of the first coherent portion, fifth means for selectively retarding the phase $\epsilon_2$ between the $E_x$ and $E_y$ vectors of the second coherent portion, means for respectively superimposing the first and second coherent portions on said first and second beams at said first and second photodetectors, and correlator means responsive to the outputs from said photodetectors for producing an output indicative of the cross correlation function between the total light at each of said photodetectors whereby said phase and said phase angle can be determined from the values of $\theta$.

2. Apparatus according to claim 1 in which said second means comprises means for varying the optical path traveled by one of said coherent portions.

3. Apparatus according to claim 1 in which said second means selectively modulates the phase $\theta$, and which further includes means for generating a signal corresponding to said modulated phase $\theta$, means for selectively phase shifting said signal, and synchronous detection means responsive to both said phase shifted signal and said correlator output signal.

4. Apparatus according to claim 1 in which said fourth and fifth means each selectively modulates the respective phases $\epsilon_1$ and $\epsilon_2$ at the same frequency, and which further includes sixth means for generating a signal corresponding to one of said modulated phases, seventh means for selectively phase shifting said signal, and synchronous detection means responsive to both said phase shifted signal and said correlator output signal.

5. Apparatus according to claim 4 in which said second means selectively modulates the phase $\theta$, and which further includes eighth means for generating a signal corresponding to said modulated phase $\theta$, and means for selectively connecting one or the other of said sixth and eighth means to said seventh means.

6. Apparatus for the measurement of the phase between the vectors and the phase angle of the phase coherence factor of first and second partially coherent beams, comprising in combination: a first photodetector means upon which said first light beam impinges, a second photodetector means upon which said second light beam impinges, a coherent background source of light, means to linearly polarize said coherent light at any angle α, first means for dividing said linearly polarized coherent light into first and second portions each remaining linearly polarized at the angle α, second means for selectively varying the phase relationship $\theta$ between said first and second coherent portions, third means following said second means for selectively retarding the phase $\epsilon_1$ between the $E_x$ and $E_y$ vectors of the first coherent portion, fourth means following said second means for selectively retarding the phase $\epsilon_2$ between the $E_x$ and $E_y$ vectors of the second coherent portion, fifth means for respectively superimposing the first and second coherent portions on said first and second beams at said first and second photodetectors, and correlator means responsive to the outputs from said photodetectors for producing an output indicative of the cross correlation function between the total light at each of said phodetectors whereby said phase and said phase angle can be determined from the values of $\theta$, α, $\epsilon_1$ and $\epsilon_2$ at selected values of said output.

7. Apparatus according to claim 6 in which said second means comprises means for varying the optical path traveled by one of said coherent portions.

8. Apparatus according to claim 6 in which said second means selectively modulates the phase $\theta$, and which further includes means for generating a signal corresponding to said modulated phase $\theta$, means for selectively phase shifting said signal, and synchronous detection means responsive to both said phase shifted signal and said correlator output signal.

9. Apparatus according to claim 6 in which said third and fourth means each selectively modulates the respective phases $\epsilon_1$ and $\epsilon_2$ at the same frequency, and which further includes sixth means for generating a signal corresponding to one of said modulated phases, seventh means for selectively phase shifting said signal, and synchronous detection means responsive to both said phase shifted signal and said correlator output signal.

10. Apparatus according to claim 9 in which said second means selectively modulates the phase $\theta$, and which further includes eighth means for generating a signal corresponding to said modulated phase $\theta$, and means for selectively connecting one or the other of said sixth and eighth means to said seventh means.

11. Apparatus for the measurement of the phase between the vectors and the phase angle of the phase coherence factor of first and second partially coherent beams, comprising in combination: a first photodetector means upon which said first light beam impinges, a second photodetector means upon which said second light beam impinges, a coherent background source of light, first means to linearly polarize said coherent light at a fixed angle $\alpha$, second means for dividing said linearly polarized coherent light into first and second portions each remaining linearly polarized at the angle $\alpha$ and for selectively varying the phase relationship $\theta$ between said first and second coherent portions, third means following said second means for operating on said first coherent portion, said third means comprising means to divide said first coherent portion into first and second coherent beams and to selectively change the phase $\epsilon_1$ between them, together with means for rotating resultant vector of said first coherent beam at right angles to the resultant vector of said second coherent beam and means to selectively interrupt either of said first and second coherent beams, fourth means operating on said second coherent portion following said second means and comprised according to said third means for selectively producing first and second coherent beams therefrom having resultant vectors at right angles to each other with a phase difference of $\epsilon_2$, fifth means for respectively superimposing the first and second coherent beams from said third means on said first beam at said photodetector, and for superimposing said first and second coherent beams from said fourth means on said second beam at said second photodetector, and correlator means responsive to the outputs from said photodetectors for producing an output indicative of the cross correlation function between the total light at each of said photodetectors whereby said phase and said phase angle can be determined from the values of $\theta$, $\alpha$, $\epsilon_1$ and $\epsilon_2$ at selected values of said output.

12. Apparatus according to claim 11 in which said second means selectively modulates the phase $\theta$, and which further includes means for generating a signal corresponding to said modulated phase $\theta$, means for selectively phase shifting said signal, and synchronous detection means responsive to both said phase shifted signal and said correlator output signal.

13. Apparatus according to claim 11 in which said third and fourth means each selectively modulates the respective phases $\epsilon_1$ and $\epsilon_2$ at the same frequency, and which further includes sixth means for generating a signal corresponding to one of said modulated phases, seventh means for selectively phase shifting said signal, and synchronous detection means responsive to both said phase shifted signal and said correlator output signal.

14. Apparatus according to claim 13 in which said second means selectively modulates the phase $\theta$, and which further includes eighth means for generating a signal corresponding to said modulated phase $\theta$, and means for selectively connecting one or the other of said sixth and eighth means to said seventh means.

References Cited in the file of this patent

Brown et al.: Interferometry of the Intensity Fluctuations in Light III, and IV, Proceedings of the Royal Society of London, vol. 248, Sera. A. 1958, pages 199–237.